United States Patent Office 3,808,117
Patented Apr. 30, 1974

3,808,117
CONTINUOUS LEACHING-PRECIPITATION METHOD AND APPARATUS
Wrethel Spendlove and Lynn Evan Burr, Henderson, Nev., assignors to Associated Smelters, Inc., Las Vegas, Nev.
Continuation of abandoned application Ser. No. 11,052, Feb. 13, 1970. This application Apr. 3, 1972, Ser. No. 240,521
Int. Cl. B01k 3/00; C23b 5/78
U.S. Cl. 204—234          15 Claims

ABSTRACT OF THE DISCLOSURE

A launder type leacher and cementation cell for the acid solution includes reciprocably movable rabbles in the leacher for continuously moving and agitating ore deposited in one end of the leacher to and out of the opposite end as tailings. The metal-rich solution clarified of the slimes is deposited in one end of the cementation cell and the metal-rich slurry is electrolytically separated from the solution in said cell, passing rotary electrodes that expedite and promote optimum separation of metal from the solution. Where sulfide ores are processed the solution in the leacher is an electrolyte and electrical continuity in the solution is maintained between titanium or stainless steel armoured rabbles in the leacher and spaced electrodes gasket-fitted against the walls of the cementation cell through electrolyte-soaked diaphragms in ducts communicating between the cementation cell and leacher.

SUMMARY

This is a continuation of application Ser. No. 11,052, filed Feb. 13, 1970, now abandoned.

In the example hereinafter described, the solvent specifically specified is a sulfuric acid solution, both with respect to sulfide and oxide ore, and while reference will be made to copper sulfate and oxide ore, and to the recovery of copper, it is to be understood that the apparatus and process may be employed with other solvents such as solutions of cyanide, hydrochloric acid, etc., and for the separation and recovery of the noble metals, lead, zinc, nickel, uranium, etc., from ores.

Heretofore the leaching step has been slow, incomplete or imperfect, and quite expensive. The ore has been placed in tanks of the leaching solution for many days after which the solution is drained from the tank and the copper separated by precipitation.

One of the objects of the present invention is the provision of a method and apparatus for not only reducing the leaching and cementation time to a small fraction of the time heretofore required, but to also perform these operations more economically and efficiently.

In the present instance the ore is crushed and is fed into the ore receiving end of a launder containing the sulfuric acid solution of the correct strength and temperature according to the nature of the ore, its assay, etc.

The ore is then moved to the opposite or discharge end of the launder by reciprocating rabbles that agitate the ore with each thrust of the rabbles thereagainst toward said opposite end. By the time the ore reaches the opposite end, its metallic content, such as copper, is leached therefrom and the acid in the solution at said opposite or discharge end is saturated or spent. The exhausted ore is withdrawn and the copper rich solution is clarified of slimes and discharged into the receiving end of the cementation cell in which cell the solution is under the influence of an electrical potential to cause precipitation of the copper whereby the metal-free acid will be rejuvenated and is then discharged into the aforesaid receiving end of the ore-launder for again commencing the cycle as fresh ore is continuously fed into the launder at its receiving end.

The copper slurry won from the solution in the cementation cell is continuously withdrawn for ultimate formation into cakes or blocks.

Heretofore the percentage of impurities in the slurry has necessitated purification by smelting resulting in objectionable pollution of the air, as well as involving employment of a smelter and the attendant steps. With the present invention the slurry withdrawn from the cementation cell contains a percentage of impurities that is so small as to indicate their effective and economically feasible removal by steps other than by smelting, and one of the objects of the invention is the economic production of a metal rich slurry to the point where further purification without smelting is feasible.

Much of the metal sulfide and oxide ores are found in relatively remote locations, or in locations where the building of a metal recovery system at the site, or at a point to which the ore may be stripped would be unprofitable, considering the assay of the ore.

An additional object of the invention is the provision of a leacher-cementation cell process and equipment that enables the profitable recovery of metal from ore in locations and quantities not heretofore found to be economically feasible, and which equipment enables ready and rapid tailoring of the equipment to obtain optimum results in processing ore according to its character and assay.

The complete recovery involves washing the tailings and slimes removed from the discharge end of the ore-launder and return of the metal-rich solution clarified of slimes to the cementation cell, and also washing the acid from the copper slurry and its return to the receiving end of the ore launder, as well as maintaining the desired strength of the acid solution. However, the leaching step and the precipitation of the metal in the cementation cell by electrolysis are not in batches, but is continuous, and the complete method requires only a very small fraction of the time and expense required by conventional batch method, and at a far higher efficiency.

Where sulfide ore is processed, the solution in both the launder and the cementation cell is an electrolyte with electrical continuity being maintained between the steel faced rabbles in the ore-launder and the electrodes in the cementation cell, thereby accelerating the leaching step. In the case of oxide ore the solution in the ore launder is not an electrolyte.

DETAILED DESCRIPTION

Figure 1:
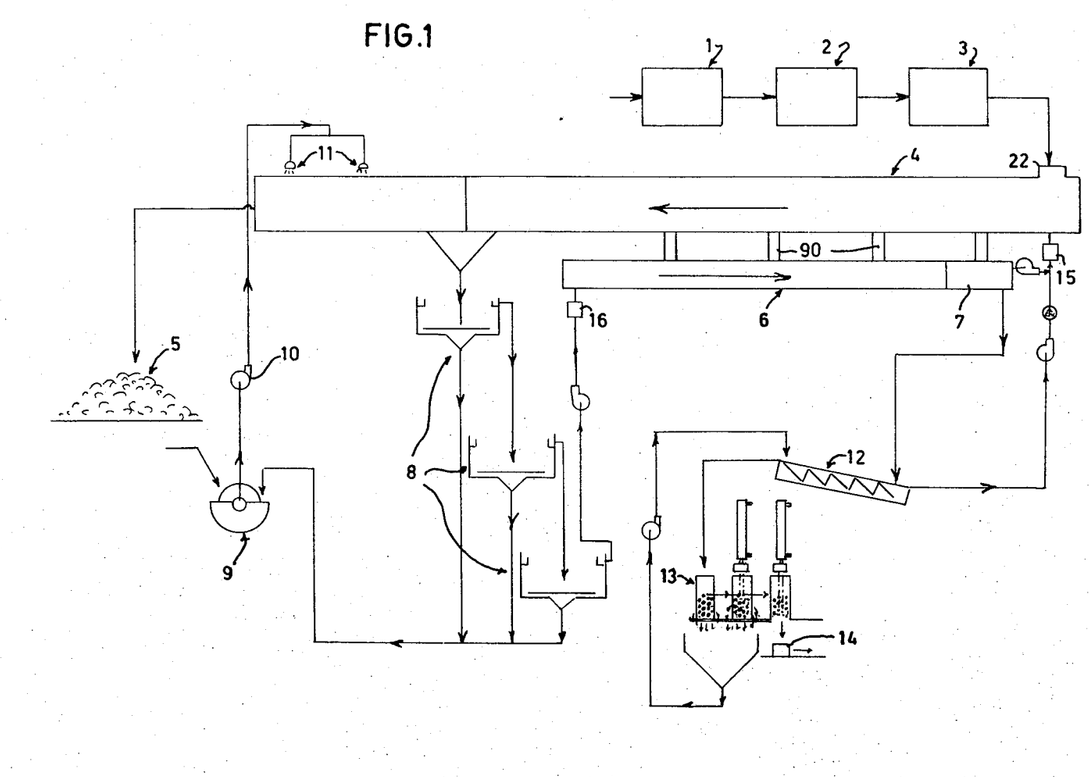
FIG. 1 is a flow sheet of the method in which the apparatus is diagrammatically shown.

Referring to FIG. 1, assuming the ore from which the metal to be extracted is from an oxide zone, or a sulfide zone, it is crushed by a conventional ore crusher at 1, and is then screened at 2 and the screened ore at say pieces preferably of ⅜" maximum thickness are continuously fed by an ordinary feeder 3 into the receiving end of a horizontal leaching launder 4 containing an aqueous sulfuric acid solution of the desired strength according to the assay. This launder may be called the leacher inasmuch as the leaching occurs therein.

If the ore is a sulfide ore, the solution therein is initially electrolytic in action, as will later be explained more in detail, but not if the ore is an oxide ore.

The ore in the leacher is progressively moved from the receiving end thereof to the opposite, or discharge end, at a predetermined rate of speed consistent with the rate at which the ore is fed into the leacher, which rate may be varied, and at the same time the ore and solution are agitated thereby promoting thorough and changing contact between the solution and the ore.

Simultaneously with said movement of the ore and solution from the receiving to the discharge end, and the metal enrichment of the solution and extraction of the metal from the ore during said movement, a fresh acid solution and ore are fed into the leacher at said receiving end and the spent ore and metal-rich acid are withdrawn from the discharge end of the leacher.

The spent ore from which the metal has been extracted, and the metal enriched solution in which the acid is also spent, are respectively conducted from the discharge end of the leacher to the tailing dump 5, and into the receiving end of the cementation launder, generally designated 6, and which launder 6 will hereinafter be referred to as the cementation cell.

The metal-rich solution so deposited in the receiving end of the cementation cell continuously flows toward the opposite or discharge end past and in contact with electrodes that establish an electrical potential in said solution to progressively precipitate the metal to the bottom of the cementation cell. Between the electrodes and the discharge end of the cementation cell, a predetermined length 7 (FIGS. 1 and 2) of the cell is uninterrupted to the flow of the solution to said discharge end, which length comprises a settling section or chamber wherein separated metal still in suspension in the solution will settle to the bottom of the cell.

The precipitated metal in the form of a slurry is continuously withdrawn from the bottom of the cementation cell at the discharge end of the latter.

The solution at the discharge end is rejuvenated due to loss of the metal, and it, together with the necessary make-up water and acid at the desired predetermined strength and temperature required in the leacher, are continuously returned to the receiving end of the leacher in an amount to preferably retain a desired uniform level of the solution in the leacher.

It should be noted that the metal-rich solution and slimes on ore withdrawn from the discharge end of the leacher are separated therefrom in conventional, continuous clarifiers generally designated 8 (FIG. 1) to remove the slimes and the clarified metal-rich acid solution is returned to the receiving end of the cementation cell. The slimes from the classifiers may be conducted to a centrifugal separator 9 where they may be washed by make-up water added to the separator, and which water may be returned by a pump 10 in a line from the separator to sprayers 11 at the discharge end of the leacher for washing the tailings before discharge of the latter to the tailing pile 5.

The slurry of metal particles withdrawn from the discharge end of the cementation cell are fed to a conventional washer 12 where it is washed and the acid wash water is returned to the receiving end of the leacher, providing the make-up water hereinbefore mentioned.

The metal-powder from the washer 12 may be delivered to a press or mold 13 of any suitable kind in which the powder or slurry is compressed to reduce its moisture content and to also rid it of ferrous iron. The resultant product is a cake or body 14 for shipment or further refining.

In processing copper oxide and sulfide ore it has been found that the pure copper content of compressed metal powder 14 is approximately from 85% to 95%, and the relatively small amount of remaining impurities in most instances may be eliminated without resort to smelting.

The solvent in the leacher and cementation cell is preferably maintained at a temperature of at least 90° F., hence in cold weather or where the temperature of the solvent is reduced by the addition of water or acid, a thermostatically-controlled heater 15 may be adjacent the inlet end of the leacher and a similar heater 16 at the inlet end of the cementation cell to maintain the desired temperature of the solution in the leacher and cell.

The acid content of the solution normally is approximately 2% to 5% according to the character of the ore, and controls for maintaining the desired strength are conventional.

In locations readily accessible to the construction of forms and materials for making the leacher and cementation cell of concrete, and where the delivery thereof is at reasonable rates, the leacher may comprise a horizontally-elongated mastic-coated launder of concrete having spaced, parallel side walls 20 (FIG. 5) and a horizontal bottom wall 21. A side inlet 22 for ore from the feeder is in one wall 20 at the inlet end.

A pair of tracks 23 (FIG. 5) respectively secured on the upper edges of said walls 20 extend longitudinally of said side walls from the discharge end to the receiving end, and supported on said tracks by a plurality of pairs of wheels 24 is a rabble-support generally designated 25.

Figure 5:
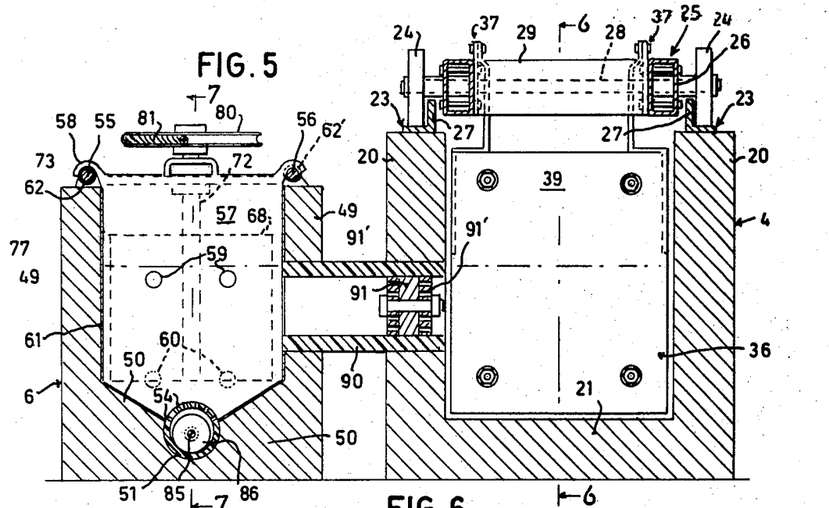
FIG. 5 is an enlarged, cross-sectional view approximately along line 5—5 of FIG. 2.

The rabble support 24 comprises a pair of elongated, parallel, side frame members 26 respectively positioned above and adjacent to and between the pair of tracks 23, said tracks having upstanding flanges 27 thereon between each pair of wheels 24 to retain the wheels on the tracks.

Said side frame members may carry bearings for the axles 28 supporting said wheels 24, and at equally spaced points along the length of said side frame members, the latter are connected by rigid cross frame members 29.

The ends of the cross frame members adjacent to the receiving end of the leacher are connected by a cross frame member 30 (FIG. 2) that, in turn, is connected with one end of a hydraulically-actuated, horizontally reciprocable plunger rod 33, the plunger of which is within hydraulic cylinder 34.

Fluid pressure lines connect with opposite ends of the cylinder, and a conventional control system 35 (FIG. 2) including a hydraulic pump and valves, are operatively connected with said lines to provide for varying the rate of reciprocation of the latter for achieving optimum efficiency in the extraction of the metal values, according to the assay and character of the ore, as will appear hereinafter.

The words "forward," "forwardly," "rear," and "rearwardly," and words of similar connotation used herein relate to the direction of movement of the ore and solution, whether in the leacher or cementation cell.

Rabbles 36 are each hingedly suspended within the leacher from one of the side frame members 26 adjacent to the forward side of one of the cross frame members 29, for swinging about a horizontal axis adjacent to and parallel with each cross frame member from a vertical position depending from the hinges 37 (FIGS. 5, 6) into the leacher.

Figure 6:
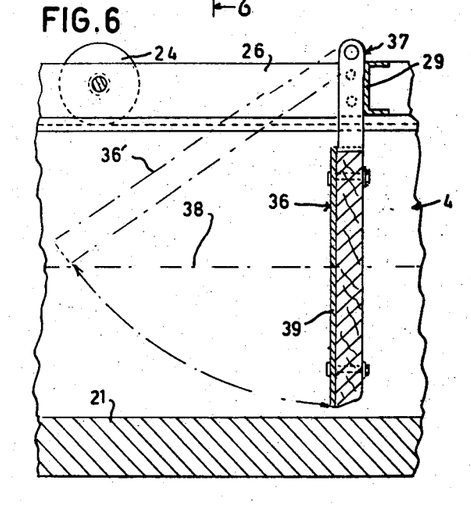
FIG. 6 is a fragmentary enlarged, cross-sectional view along line 6—6 of FIG. 5.

The outline of each rabble conforms generally to the inside cross-sectional outline of the leacher transversely of the latter, but the edges of said rabble are spaced slightly from the side walls and bottom wall of the leacher.

Swinging of each of the rabbles rearwardly past a vertical position is prevented by the cross frame member 29 adjacent thereto (FIG. 6) as the upper portion or suspension means of each rabble engages the forward side of the cross frame member when the rabble is vertical. However, each rabble is free to swing forwardly. Thus, upon each forward movement of the rabble frame by forward movement of the plunger rod 33, the rabbles will be vertical and the ore ahead of the rabbles will be moved forwardly, and upon each retraction of the plunger rod, the rabbles will swing forwardly over the ore as indicated by dash-dot lines 36' in FIG. 6. Also, with each forward movement of the rabbles, the major portion of the body of the solution ahead of the rabbles will be urged forwardly, it being noted that, normally, the upper level of the ore is approximately at line designated 38 (FIG. 6) while the solution is substantially higher.

Each rabble may be of wood or plastic having its forward face provided with a plate 39 of titanium or stainless steel (FIGS. 5, 6) which may be part of the hinges, whereby electrical continuity will be established from the tracks 23 through the wheels 24, axles 28, side frame members 25, and hinges 37 to said plates 39, when the method and apparatus is used for sulfide ore.

Figures 3, 4:
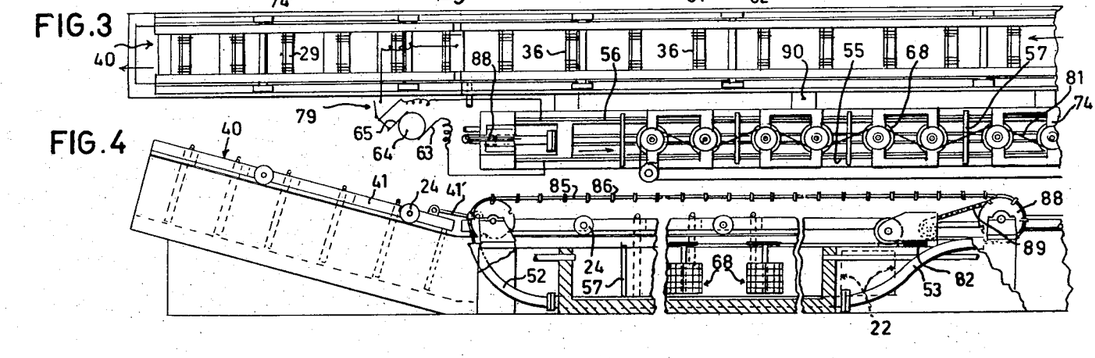
FIG. 3 is a top plan view of the left-hand end of the apparatus in continuance of the left end of the portion shown in FIG. 2, the electrical circuit and certain other elements being diagrammatically or semi-diagrammatically indicated, and a length of the slurry removing rope shown in FIG. 4 being omitted for clarity.
FIG. 4 is a vertical sectional view of the cementation cell longitudinally of the latter, but broken in length to accommodate the sheet, and showing the discharge end portion of the ore-launder in elevation, and also broken in length.

The discharge end portion 40 (FIG. 4) of the launder 4 extends slantingly upwardly and the row of rabbles 36 continue up the inclined portion. Extensions 41 of the side frame members 26 of the rabble support 25 extend up the inclined portion 40 and have tracks corresponding to tracks 23 thereon for wheels 24 that support the rabbles of said portion 40 in the same manner as already described for the rabbles in the horizontal section. Links 41' pivotally connect the extensions 41 of the side frame members with the portions 26 that are supported on the main portion of the leacher (FIG. 4). By this structure the ore, after extraction of the metal values therefrom, is automatically moved out of the leacher for washing, and for removal thereafter to the tailing dump 5.

Within the receiving end of the leacher a rake 44 (FIG. 8) is provided, said rake being shown in a position for passing forwardly past the side inlet 22. A cam follower 45 is supported on the rake in a position offset laterally to one side and is below a horizontally-extending cam track 46. The track 46 may be horizontally pivotally supported adjacent its rear end to one of the side walls of the leacher at 47 and a rigid stop 48 adjacent the forward end supports the cam track horizontal.

Figures 2, 8:
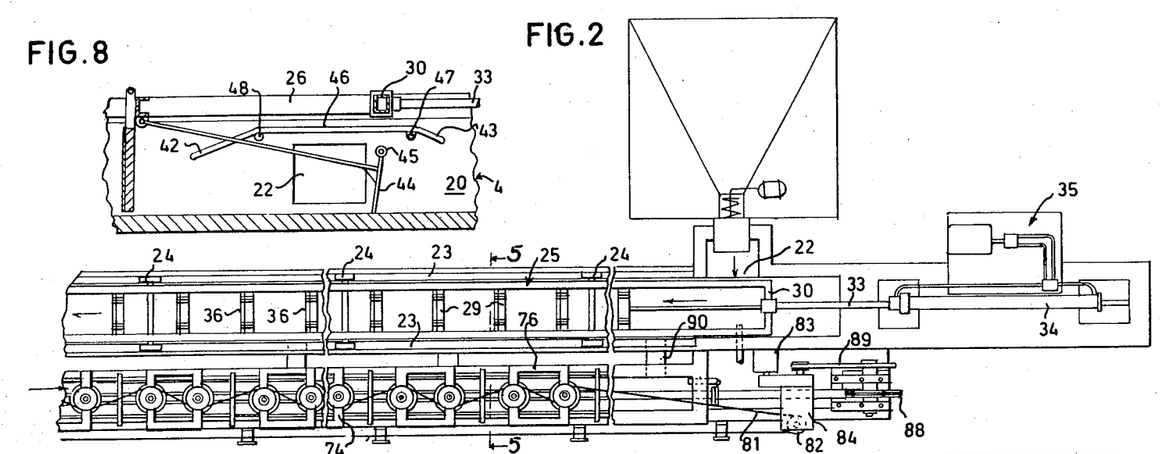
FIG. 2 is a top plan view of the right-hand portion of the apparatus, broken in length to accommodate it to the sheet.
FIG. 8 is an enlarged, fragmentary, cross-sectional view through the leaching launder at the ore-receiving end.

When the rake is moved forwardly past the side inlet to the forward end of its stroke, the follower 45 engages the underside of the downwardly inclined forward end 42 of the track and lifts the inclined forward end off stop 48 and after passing said end of the cam track drops and upon return movement of the rake, the follower 45 rides up on the forward end 42 of the cam track 46 elevating the rake and the latter is carried on said track past the inlet opening 22 and is lowered as the follower moves down the downwardly inclined rear end portion 43 and off said portion to a position behind the ore that is fed into the launder through inlet 22. The ore moved forwardly upon each forward movement of the rake is engaged by the nearest rabble for moving the ore forwardly for engagement by the adjacent rabble on its forward stroke.

This horizontal reciprocable movement of the ore by the rabbles agitates the ore and the solution effecting a thorough mixing of the solution with the ore materially expediting the leaching step, which is completed by the time the ore is discharged from the leacher.

The cementation cell 6 has opposite vertical side walls 49 and a bottom wall. The inside surface of the bottom wall 50 has an upper surface that extends convergently downwardly to meet the sides of a cylindrical, horizontal, slurry-receiving tube 51 (FIG. 5) of plastic or composition, acid resistant material that is set in the bottom of the cementation cell. Said tube extends horizontally the length of the cementation cell and through the end walls of the latter, and curves upwardly in imperforate end sections 52, 53 (FIG. 4) respectively, at the receiving and discharge ends of the cell. The upper portion of the tube 51 within the cementation cell is formed with perforations 54 (FIG. 7) through which the copper powder or slurry passes when precipitated from the solution.

Conductor bars 55, 56 are respectively secured on, and extend longitudinally of the upper edges of the sides of the cementation cell, and a plurality of iron electrodes 57 are removably suspended by conductor hangers 58 (FIG. 5) on said bars in spaced relation longitudinally of the cementation cell.

There may be any desired number of electrodes 57 in the cementation cell and they are formed with flow openings 59, 60, alternately top and bottom (FIG. 5), and the lateral and bottom edges are provided with a sealing gasket 61 to substantially confine the flow of the electrolyte to said openings, to promote a more efficient operation. Thus the flow is generally vertically undulatory in the cementation cell from the receiving or left-hand end, moving upwardly between alternate spaced pairs of electrodes and downwardly between such spaced pairs thereby materially extending the flow path of the solution contacting these electrodes without lengthening the cell.

The electrode hangers 58 that are supported on bar 55 are electrically insulated from bar 55 by electrical insulation 62, but are in direct contact with bar 56, which bar 56 is connected with positive pole 63 (FIG. 3) of a D.C. source 64 of electricity, the negative pole 65 being connected with bar 56. Thus the electrodes 57 are anodes.

Figure 7:
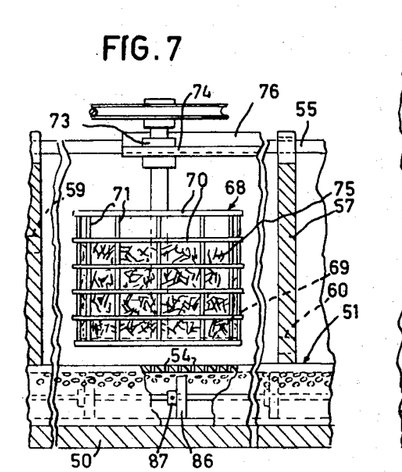
FIG. 7 is an enlarged, fragmentary, cross-sectional view approximately along line 7—7 of FIG. 5, showing one of the electrodes in elevation, and two other electrodes at opposite sides thereof.

Spaced between each adjacent pair of anodes 57 is a pair of electrodes generally designated 68 (FIGS. 3, 4, 7).

Each of the electrodes 68 comprises a basket-like rack or receptacle of stainless steel or titanium having an open-work grill bottom 69 and open-work sides. The sides may comprise vertically spaced, coaxial rings 70 secured around an annular row of vertical bars 71 that, in turn, are connected at their lower ends with the bottom 69. The upper end of the receptacle is open and a central vertical shaft 72 extending upwardly from and secured to the bottom wall suspends each receptacle from a bearing 73 secured to a transverse hanger 74 that extends at its ends over the bars 55, 56 but is electrically insulated from bar 56 by insulation 62' (FIG. 5) in the same manner as the anode hanger is electrically insulated from bar 55. The end of the hanger 74 extending over bar 55 is in electrical contact with said bar.

Each receptacle contains iron which may be scrap or any ferrous material suitable for cathode operation.

The receptacles 68 which, including their contents, provide cathodes in the electrical circuit, and are spaced from the sides of the cementation cell, but extend substantially across the space between them (FIG. 5) in the path of flow of the electrolyte in the cell. These cathodes are suspended from the hangers 74 for rotation about their vertical axes.

Inasmuch as a pair of the cathodes 68 is between each adjacent pair of anodes 57, the hangers 74 for each pair may be connected by corresponding side members 76 (FIGS. 2, 7) that are also recessed complementary to bars 55, 56 to receive the upper portions of the latter. The bars 55, 56 themselves are seated and held in the upper edges of the sides of the cementation cell. The electrical insulation 62' on bars 56 insulates both cathodes of each set including hangers 74 and the connecting member 76 from bar 56. Extensions or flanges 77 (FIG. 5) on one of the side members 76 of each set of cathodes may extend downwardly over the side wall 49 that is remote from the leacher and be bolted thereto by bolts 78 to hold the cathodes rigidly in position against shifting when in operation. Electrical insulation is used where required to prevent leakage of current and to restrict it to the cathodes and anodes and the solution. The frames supporting the cathodes of each pair also uniformly space them apart.

The cathodes of each pair between adjacent anodes are oppositely rotated about their vertical axes during flow of the solution therepast, thereby insuring a continuously changing contact between the solution and the cathode and accelerating the precipitation of the copper or whatever metal is being separated from the ore.

One means for revolving the cathodes is the provision of a horizontally-disposed pulley 80 on the upper end of each vertical shaft 72 having a radially outwardly opening groove in its outer periphery in which one of the runs of an endless wire rope 81 (indicated by a single line in FIGS. 2, 3) which rope is positioned with said run extending past and in engagement with opposite outwardly facing sides of adjacent pairs of pulleys 80 in a direction longitudinally of the cementation cell. The rope 81 may extend at one end around a pulley 82 (FIG. 2) driven by a motor 83 through variable speed gear box 84, and any conventional means may be employed to support the rope between the end pulleys and to maintain it relatively taut.

Upon the electrical circuit being closed the metal in the metal-rich clarified solution in the cementation cell flowing to the discharge end will be precipitated and will pass into the tube 51 in the bottom of the cell through perforations 54 therein, forming a copper slurry, in the case of copper ore, in the tube.

As the solution is progressively robbed of the copper the acid content will be rejuvenated and this rejuvenated acid solution is withdrawn from the discharge end of the cementation cell for discharge into the receiving end of the leacher.

Tube 51 is a conveyor and conveys the slurry out of the discharge end of the conveyor for washing and pressing to cake form.

The means illustrated for withdrawing the slurry comprises an acid-resistant, endless, horizontally-extending rope 85 extending through tube 51 (FIGS. 4, 5, 7) and centrally through spaced circular discs 86. Elements 87 (FIG. 7) at the trailing sides of members 86 are secured on rope 85 and abut said trailing sides when the rope is drawn through said tube from left to right as viewed in FIGS. 4, 7, so that the slurry ahead of each member 86 will be moved through said tube out of the discharge end upon the rope being drawn through the tube from left to right.

The rope 85 extends at its ends around wheels 88 (FIG. 4) that are each formed with a groove in its outer periphery in which the rope is received, and said outer periphery is formed with spaced notches to receive the members 86. Motor 83 may drive one of said wheels 88 through the variable speed transmission 84 and a chain 89 connects the output or driven end of the transmission with a wheel 88 to drive the conveyor.

A plurality of open ended, horizontally-spaced tubes 90 (FIGS. 2, 5) of tile or the like extend between the leacher and the cementation cell at the same level, each having a glass wool diaphragm 91 therein held between perforated wooden discs 91' by bolts (FIG. 5). These diaphragms become soaked with the solution in the leacher and cementation cell, and provide for electrical continuity between the rabbles in the leacher and the electrodes in the cementation cell when switch 79 in the electrical circuit (FIG. 3) is closed, and sulfide ore is being processed. For oxide ore the switch is open.

Where sulfide ore is being processed and switch 79 is closed, the negative pole 65 from the D.C. source 64 will be connected with the rabble support 25 (FIG. 3) that, in turn, is connected with plates 39 through hinges 37.

In many instances, particularly where the site is remote and where the location and character of the ore may change from time to time or be temporary, the fabricating of a concrete launder for the leacher and cementation cell at the site may be impossible or too expensive.

The form of the invention shown in FIGS. 9 to 12, inclusive, provide preformed sections, each comprising a portion of the launder and cementation cell, each section being readily transported by truck or helicopter to the site where the sections may be quickly secured together to provide an installation of suitable length for processing the particular ore at the site.

Figure 9:
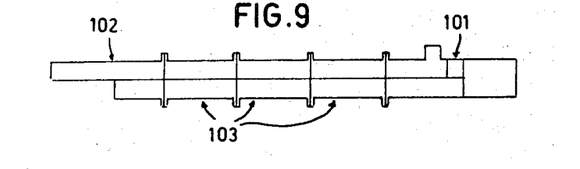
FIG. 9 is a schematic view illustrative of a modified form of the invention.

For example, in FIG. 9, five unitary separable sections are indicated, each including a portion of the leacher and cementation cell, the end sections 101, 102, respectively, designate the sections that differ from each other and from the others in that the end section 101 incorporates structure at the receiving end of the leacher and the end portion of the cementation cell that is adjacent thereto, while the section 102 incorporates the structure at the discharge end of the leacher and the end portion of the cementation cell that is adjacent thereto. The several sections 103 may be identical, and the length of the apparatus required at the particular site will be determined by the number of corresponding intermediate sections as are used.

The movable parts of the apparatus used on the assembled units, such as the rabbles and their carriage, the slurry rope, electrodes and drive rope for the cathodes may readily be modified as to number and length. These are normally pre-formed in any event. The rabbles are merely indicated in their positions in an intermediate section in FIG. 10 and the electrodes are shown in position in FIGS. 10–12.

Figure 10:
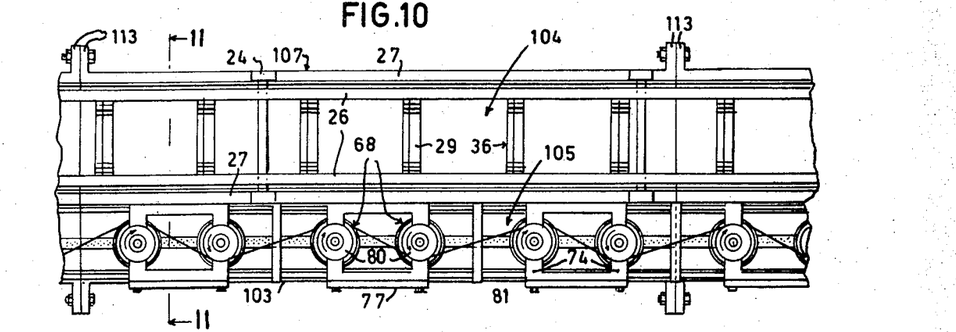
FIG. 10 is a fragmentary top plan of a module and adjacent portions of the form shown in FIG. 9, certain parts being omitted.
Figure 11:
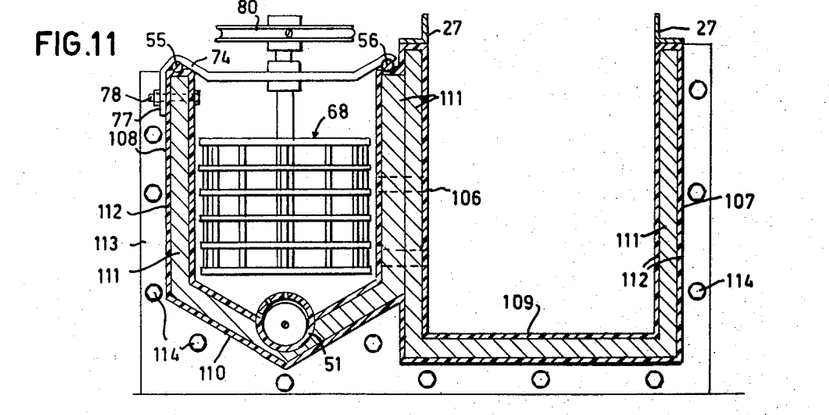
FIG. 11 is an enlarged cross-sectional view taken along line 10—10 of FIG. 9.
Figure 12:
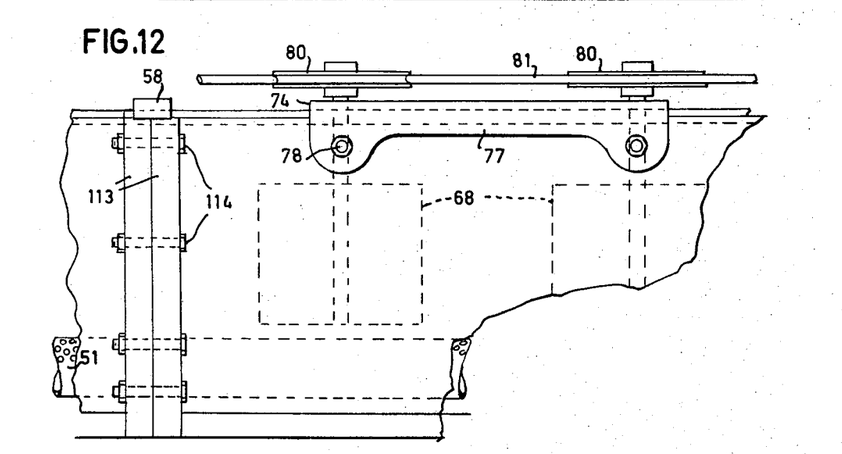
FIG. 12 is a fragmentary enlarged side elevational view of a portion of the structure shown in FIG. 1, partly broken away and in cross section.

Referring to FIG. 10, one complete intermediate section of the leaching launder and cementation cell is shown, the leaching launder portion being generally designated 104 and the cementation cell being generally designated 105. The leacher and cementation cell have a common wall 106 between them, which forms are of the side walls of the leacher and cementation cell, while the other side of the leacher is wall 107 and the other side of the cementation cell is 108. A bottom wall 109 is provided for the leacher portion and a bottom wall 110 is in the cell portion. These bottom and side walls have the same inside cross-sectional contour as the side walls and bottom walls of the leacher 4 and cell 6 of FIG. 5.

In the modified form (FIGS. 10, 11, 12) the side and bottom walls may be of wood 111 enclosed in fiberglass 112 or the equivalent. This wood may be plywood and outwardly projecting flanges 113 around the outer sides of the terminal ends of the intermediate sections, and around one end of each end section 101, 102 may also be of wood enclosed in fiberglass, or the like, provide means for bolting the sections together by bolts 114.

The structure identical to that of structure already described will bear the same numbers. The slurry collecting tube 51 is secured in the bottom of each intermediate section of the cementation cell for connecting with upwardly extending end portions, and conductor bars 55, 56 may be on the upper end of each side of the cementation cell. Any conventional means may be employed for connecting the slurry tubes 51 in the separable sections and for connecting the bars. Whether the hangers for the electrodes carry the insulation means for respectively insulating them from one of the bars 55 or 56, or whether the insulation is on the bars is immaterial, and mastic or any other suitable acid resistant sealant may be used to preclude leakage of the solution.

It is seen that the sectional structure not only provides light weight, rugged sections impervious to attack by acid and resistant to deformation and breakage and the fiberglass cover eliminates the likelihood of accidental grounding the electrical circuit through the walls of the cementation cell and leacher. The sections themselves and the other elements associated therewith may be readily transported by truck or by air and assembled at the site to provide for optimum efficiency for the character of the ore at the site.

The present method is continuous. The classifiers 8 may be of the well-known Dorr Continuous Thickener type and their capacity and number is preferably such as to maintain a uniform continuous flow of the solution through the leacher and cementation cell at full capacity of each for the most efficient operation. The outlets of the solution in the leacher and cementation cell are side outlets spaced above the bottom of the launders so there is no clogging by slimes or the like.

The apparatus disclosed is economical to operate, requiring only one operator, and in actual operation it has been found that a five horsepower motor is adequate to handle a leacher and cell assembly having a capacity of from fifty to one hundred tons of ore per twenty-four hour day.

The time required for leaching and precipitating the values from the solvent vary according to the character of the ore, the size of the pieces and the assay, and smelting the dried or drained slurry is eliminated in many instances where heretofore required, due to the purity of the product obtained, thereby avoiding, or at least materially reducing, the pollution of the air as well as reducing costs.

What we claim is:

1. Apparatus for extracting soluble metal in crushed metal bearing material from the latter comprising:
   (a) a horizontally-disposed horizontally elongated launder and a horizontally elongated cementation cell for respectively holding a body of a solvent solution therein for said metal, said launder and said cell each having a receiving end and a discharge end;
   (b) feed means for feeding said crushed material into the solution within said launder at the receiving end of the latter;
   (c) material moving means within said launder for engaging and for moving said material therein from said receiving end through the solution therein to and out of said solution and launder at the discharge end of said launder;
   (d) separate solution conducting means respectively operatively connecting said launder adjacent its discharge end with the receiving end of said cementation cell and operatively connecting the discharge end of said cementation cell with the receiving end of said launder for circulation of said solution through said launder and said cementation cell in a direction from their receiving to their discharge ends;
   (e) spaced electrodes in an electrical circuit supported within said cementation cell within the body of said solution to be held therein providing a row of alternate anodes and cathodes within said solution to effect precipitation of the metal in said solution;
   (f) conveyor means in the bottom of said cementation cell for receiving and moving out of said cementation cell the metal precipitated from said solution.

2. In apparatus as defined in claim 1:
   (g) said material moving means including a carriage supported on said launder for movement thereon in a direction toward said discharge end and material engaging means of said carriage extending into the body of the solution to be held in said launder for engaging and moving the material fed into said receiving end of said launder to and out of said solution and launder at said discharge end of said launder during said movement of said carriage, and means connected with said carriage for so moving the latter.

3. In apparatus as defined in claim 1:
   (g) means supporting the cathodes within said cementation cell for movement relative to said cell and the solution to be held in said cell during said circulation of said solution, and means connected with said cathodes for so moving them.

4. In apparatus as defined in claim 3:
   (h) said cathodes each comprising an open-work receptacle of electrical conductive material resistant to corrosion by said solution containing scrap ferrous metal, and means connected with each receptacle for rotating it within said cementation cell and within the body of said solution within the latter.

5. Apparatus for extracting soluble metal in crushed metal bearing material from the latter comprising:
   (a) a horizontally-disposed launder and a horizontally elongated cementation cell for respectively holding a body of a solvent solution therein for said metal, said launder and said cell each having a receiving end and a discharge end;
   (b) feed means for feeding said crushed material into the solution within said launder at the receiving end of the latter;
   (c) material moving means within said launder for moving said material therein from said receiving end through the solution therein to and out of the discharge end of said launder;
   (d) separate solution conducting means respectively operatively connecting said launder adjacent its discharge end with the receiving end of said cementation cell and operatively connecting the discharge end of said cementation cell with the receiving end of said launder for circulation of said solution through said launder and said cementation cell in a direction from their receiving to their discharge ends;
   (e) spaced electrodes in an electrical circuit supported within said cementation cell within the body of said solution to be held therein providing a row of alternate anodes and cathodes within said solution to effect precipitation of the metal in said solution;
   (f) conveyor means in the bottom of said cementation cell for receiving and moving out of said cementation cell the metal precipitated from said solution;
   (g) means supporting the cathodes within said cementation cell for rotation relative to said cell and the solution to be held in said cell during said circulation of said solution;
   (h) said cathodes being in adjacent pairs suspended within said launder and an anode spaced between adjacent pairs of said cathodes; and
   (i) means connected with the cathodes of each pair for continuously rotating them relative to said cell and the solution to be held within said cell.

6. Apparatus for extracting soluble metal in crushed metal bearing material from the latter comprising:
   (a) a horizontally-disposed launder and a horizontally elongated cementation cell for respectively holding a body of a solvent solution therein for said metal, said launder and said cell each having a receiving end and a discharge end;
   (b) feed means for feeding said crushed material into the solution within said launder at the receiving end of the latter;

(c) material moving means within said launder for moving said material therein from said receiving end through the solution therein to and out of the discharge end of said launder;
(d) separate solution conducting means respectively operatively connecting said launder adjacent its discharge end with the receiving end of said cementation cell and operatively connecting the discharge end of said cementation cell with the receiving end of said launder for circulation of said solution through said launder and said cementation cell in a direction from their receiving to their discharge ends;
(e) spaced electrodes in an electrical circuit supported within said cementation cell within the body of said solution to be held therein providing a row of alternate anodes and cathodes within said solution to effect precipitation of the metal in said solution;
(f) conveyor means in the bottom of said cementation cell for receiving and moving out of said cementation cell the metal precipitated from said solution;
(g) said material moving means including a carriage supported on said launder for reciprocable movement longitudinally of the latter; and
(h) a plurality of rabbles hingedly suspended from said carriage within the body of said solution to be held within said launder for movement into material moving engagement with the material fed into said receiving end of said launder only upon movement of said carriage toward said discharge end of said launder for effecting intermittent accelerated movement of said material to said discharge end.

7. In apparatus as defined in claim 6:
(i) said rabbles each including a facing of titanium or stainless steel on its material engaging side in said electrical circuit with said electrodes;
(j) means including a duct communicating between the bodies of the solution to be respectively held in said launder and said cementation cell for maintaining electrical continuity between the facings on said rabbles and electrodes in said cementation cell; and
(k) means within said duct for obstructing passage of slimes from within said launder to within said cementation cell.

8. Apparatus for extracting soluble metal in crushed metal bearing material from the latter comprising:
(a) a horizontally-disposed launder and a horizontally elongated cementation cell for respectively holding a body of a solvent solution therein for said metal, said launder and said cell each having a receiving end and a discharge end;
(b) feed means for feeding said crushed material into the solution within said launder at the receiving end of the latter;
(c) material moving means within said launder for moving said material therein from said receiving end through the solution therein to and out of the discharge end of said launder;
(d) separate solution conducting means respectively operatively connecting said launder adjacent its discharge end with the receiving end of said cementation cell and operatively connecting the discharge end of said cementation cell with the receiving end of said launder for circulation of said solution through said launder and said cementation cell in a direction from their receiving to their discharge ends;
(e) spaced electrodes in an electrical circuit supported within said cementation cell within the body of said solution to be held therein providing a row of alternate anodes and cathodes within said solution to effect precipitation of the metal in said solution;
(f) conveyor means in the bottom of said cementation cell for receiving and moving out of said cementation cell the metal precipitated from said solution;
(g) said launder having spaced opposed side walls extending longitudinally thereof, and tracks thereon for supporting said material moving means;
(h) said material moving means including a frame supported on said tracks extending from said feed means to said discharge end of said launder, and a row of material engaging rabbles suspended from said frame into said launder to approximately the bottom of the latter for movement with said frame;
(i) power means connected with said frame for reciprocating the latter longitudinally of said launder at different selected rates of speed according to the character of the material; and
(j) hinge means swingably supporting said rabbles for movement from vertically-extending material engaging and moving positions during movement of said frame toward said discharge end to a position over the material in said launder upon movement of said carriage toward said receiving end of said launder whereby the material fed into said launder will be moved by said rabbles from said receiving end to said discharge end during said reciprocable movement of said frame.

9. Apparatus for extracting soluble metal in crushed metal bearing material from the latter comprising:
(a) a horizontally-disposed launder and a horizontally elongated cementation cell for respectively holding a body of a solvent solution therein for said metal, said launder and said cell each having a receiving end and a discharge end;
(b) feed means for feeding said crushed material into the solution within said launder at the receiving end of the latter;
(c) material moving means including a carriage reciprocable on said launder longitudinally thereof and rabbles depending from said carriage into said launder for moving said material from said receiving end to and out of said discharge end;
(d) separate solution conducting means respectively operatively connecting said launder adjacent its discharge end with the receiving end of said cementation cell and operatively connecting the discharge end of said cementation cell with the receiving end of said launder for circulation of said solution through said launder and said cementation cell in a direction from their receiving to their discharge ends;
(e) spaced electrodes in an electrical circuit supported within said cementation cell within the body of said solution to be held therein providing a row of alternate anodes and cathodes within said solution to effect precipitation of the metal in said solution;
(f) conveyor means in the bottom of said cementation cell for receiving and moving out of said cementation cell the metal precipitated from said solution;
(g) said launder including an extension in longitudinal continuation thereof at its discharge end inclined upwardly to a position above the level of the body of solution to be held in said launder for supporting material moved to said extension for movement out of said solution at said discharge end;
(h) said material moving means extending upwardly along said extension for so moving the material out of said solution;
(i) means along said extension for washing the solution from the material moved out of said solution and onto said extension for return of the solution so washed into said launder;
(j) power means connected with said carriage for reciprocating said carriage and said rabbles in a direction longitudinally of said launder; and
(k) hinge means swingably supporting said rabbles for movement from a vertically extending position during movement of said carriage toward said discharge end to a position over material in said launder upon movement of said carriage toward said receiving end whereby the material fed into said launder will be moved from said receiving end of said launder to said discharge end upon said reciprocable movement of said carriage.

10. In apparatus as defined in claim 6:
(i) said launder including an extension in longitudinal continuation thereof at its discharge end inclined upwardly to a position above the level of the body of the solution to be held in said launder for supporting material moved to said extension for movement out of said solution at said discharge end;
(j) said carriage including a section thereof having ore moving rabbles thereon and movable therewith supported on said extension of said launder in material engaging positions within said extension for moving ore up said extension and out of the body of the solution to be held in said launder upon said reciprocable movement of said frame.

11. Apparatus for extracting soluble metal in crushed metal bearing material from the latter comprising:
(a) a horizontally-disposed launder and a horizontally elongated cementation cell for respectively holding a body of a solvent solution therein for said metal, said launder and said cell each having a receiving end and a discharge end;
(b) feed means for feeding said crushed material into the solution within said launder at the receiving end of the latter;
(c) material moving means within said launder for moving said material therein from said receiving end through the solution therein to and out of the discharge end of said launder;
(d) separate solution conducting means respectively operatively connecting said launder adjacent its discharge end with the receiving end of said cementation cell and operatively connecting the discharge end of said cementation cell with the receiving end of said launder for circulation of said solution through said launder and said cementation cell in a direction from their receiving to their discharge ends;
(e) spaced electrodes in an electrical circuit supported within said cementation cell within the body of said solution to be held therein providing a row of alternate anodes and cathodes within said solution to effect precipitation of the metal in said solution;
(f) conveyor means in the bottom of said cementation cell for receiving and moving out of said cementation cell the metal precipitated from said solution;
(g) said solution conducting means operatively connecting said discharge end of said launder with the receiving end of said cementation cell including classifier means for receiving the solution from said launder and for separating the slimes therefrom whereby a clarified solution will be delivered to the receiving end of said cementation cell;
(h) said classifier means including solution-holding means connected with said receiving end of said cementation cell for continuously feeding the clarified solution to said cementation cell to maintain said circulation.

12. Apparatus for extracting soluble metal in crushed metal bearing material from the latter comprising:
(a) a horizontally-disposed launder and a horizontally elongated cementation cell for respectively holding a body of a solvent solution therein for said metal, said launder and said cell each having a receiving end and a discharge end;
(b) feed means for feeding said crushed material into the solution within said launder at the receiving end of the latter;
(c) material moving means within said launder for moving said material therein from said receiving end through the solution therein to and out of the discharge end of said launder;
(d) separate solution conducting means respectively operatively connecting said launder adjacent its discharge end with the receiving end of said cementation cell and operatively connecting the discharge end of said cementation cell with the receiving end of said launder for circulation of said solution through said launder and said cementation cell in a direction from their receiving to their discharge ends;
(e) spaced electrodes in an electrical circuit supported within said cementation cell within the body of said solution to be held therein providing a row of alternate anodes and cathodes within said solution to effect precipitation of the metal in said solution;
(f) conveyor means in the bottom of said cementation cell for receiving and moving out of said cementation cell the metal precipitated from said solution;
(g) said launder and said cementation cell each having vertically disposed side walls and a bottom wall enclosed in electrical insulation material that is resistant to corrosion by contact with said solution, said walls being divided transversely into separable sections and means for releasably securing said sections together.

13. In apparatus as defined in claim 12:
(h) said side walls and said bottom walls respectively including a core of relatively light weight electrical insulation material such as wood, and the said enclosure therefore being of plastic material thereby precluding grounding of said circuit through the walls and bottom of said launder and said cementation cell.

14. In apparatus as defined in claim 12:
(h) said launder and said cementation cell being in side-by-side parallel relation, and one of their side walls being integrally united and being common to both said launder and said cementation cell, whereby said launder and said cementation cell may be simultaneously assembled to any desired length according to the character of the material that is to be processed.

15. In apparatus as defined in claim 14:
(i) said conveyor means being a tube extending longitudinally of said cementation cell defining a portion of the bottom of the latter and formed with openings therein for passage of metal slurry precipitated from the solution in said cementation cell, and slurry engaging means within said tube movable through the latter from the receiving end of said cementation cell to and out of the discharge end of the latter;
(j) actuating means connected with said slurry engaging means for so moving the latter through said tube;
(k) said bottom wall of said cementation cell having an upper surface extending slantingly downwardly from the side walls of said cell to the openings formed in the said tube for movement of the precipitated slurry by gravity, to said openings.

References Cited

UNITED STATES PATENTS

| 700,941 | 5/1902 | Keith | 204—108 |
| 1,341,786 | 6/1920 | Dalziel | 204—108 |
| 1,447,140 | 2/1923 | McBride | 204—275 X |
| 1,991,763 | 2/1935 | Locke | 204—275 X |
| 3,589,995 | 6/1971 | McChesney | 204—202 |

JOHN H. MACK, Primary Examiner

D. R. VALENTINE, Assistant Examiner

U.S. Cl. X.R.

204—213, 275